US012341951B2

(12) United States Patent
Huo et al.

(10) Patent No.: US 12,341,951 B2
(45) Date of Patent: *Jun. 24, 2025

(54) INTRA PREDICTION METHOD AND APPARATUS, AND COMPUTER-READABLE STORAGE MEDIUM

(71) Applicant: GUANGDONG OPPO MOBILE TELECOMMUNICATIONS CORP., LTD., Guangdong (CN)

(72) Inventors: Junyan Huo, Dongguan (CN); Jianglin Wang, Dongguan (CN); Yanzhuo Ma, Dongguan (CN); Shuai Wan, Dongguan (CN); Fuzheng Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,716

(22) Filed: Oct. 31, 2023

(65) Prior Publication Data

US 2024/0064292 A1 Feb. 22, 2024

Related U.S. Application Data

(63) Continuation of application No. 17/720,442, filed on Apr. 14, 2022, now Pat. No. 11,843,724, which is a
(Continued)

(51) Int. Cl.
*H04N 19/105* (2014.01)
*H04N 19/593* (2014.01)

(52) U.S. Cl.
CPC ......... *H04N 19/105* (2014.11); *H04N 19/593* (2014.11)

(58) Field of Classification Search
CPC .......................... H04N 19/105; H04N 19/593
See application file for complete search history.

(56) References Cited

U.S. PATENT DOCUMENTS

| 9,280,835 | B2 * | 3/2016 | Lainema | .............. | H04N 19/593 |
| 9,693,054 | B2 | 6/2017 | Jeon et al. | | |

(Continued)

FOREIGN PATENT DOCUMENTS

| CN | 1535027 A | 10/2004 |
| CN | 102196270 A | 9/2011 |

(Continued)

OTHER PUBLICATIONS

First Office Action of the Malaysian application No. PI2021003167, issued on Dec. 28, 2023. 4 pages.
(Continued)

*Primary Examiner* — Irfan Habib
(74) *Attorney, Agent, or Firm* — Perkins Cole LLP

(57) ABSTRACT

Provided are an intra prediction method and apparatus, and a computer-readable storage medium. The method includes: acquiring a first reference sample set corresponding to the current processing block, wherein the first reference sample set includes at least one of a reference row adjacent to the current processing block and a reference column adjacent to the current processing block; selecting, based on a pre-set selection method, a second reference sample set from the first reference sample set, wherein the second reference sample set includes at least one reference sample in the reference row adjacent to the current processing block or the reference column adjacent to the current processing block; obtaining, based on the second reference sample set, a prediction value of the current processing block; and performing, based on the prediction value, intra prediction on the current processing block.

15 Claims, 11 Drawing Sheets

Related U.S. Application Data continuation of application No. 17/356,148, filed on Jun. 23, 2021, now Pat. No. 11,350,088, which is a continuation of application No. PCT/CN2019/077872, filed on Mar. 12, 2019.

(56) References Cited

U.S. PATENT DOCUMENTS

| | | | | |
|---|---|---|---|---|
| 10,944,989 B2* | 3/2021 | Chen | | H04N 19/186 |
| 11,102,510 B2* | 8/2021 | Racape | | H04N 19/186 |
| 11,146,798 B2* | 10/2021 | Wan | | H04N 19/117 |
| 11,159,814 B2* | 10/2021 | Huo | | H04N 19/176 |
| 11,202,080 B2* | 12/2021 | Huo | | H04N 19/119 |
| 2013/0094776 A1* | 4/2013 | Lainema | | H04N 19/61 |
| | | | | 382/233 |
| 2018/0131962 A1* | 5/2018 | Chen | | H04N 19/176 |
| 2018/0176592 A1* | 6/2018 | Lim | | H04N 19/82 |
| 2019/0116381 A1* | 4/2019 | Lee | | H04N 19/597 |
| 2019/0281290 A1* | 9/2019 | Lee | | H04N 19/119 |
| 2020/0021817 A1* | 1/2020 | Van der Auwera | | H04N 19/159 |
| 2020/0236361 A1* | 7/2020 | Jang | | H04N 19/159 |
| 2021/0136408 A1* | 5/2021 | Racape | | H04N 19/182 |
| 2021/0195199 A1* | 6/2021 | Choi | | H04N 19/146 |
| 2021/0368205 A1* | 11/2021 | Chen | | H04N 19/11 |
| 2022/0078405 A1* | 3/2022 | Francois | | H04N 19/159 |

FOREIGN PATENT DOCUMENTS

| | | |
|---|---|---|
| CN | 103796030 A | 5/2014 |
| CN | 106688238 A | 5/2017 |
| EP | 2658263 A2 | 10/2013 |
| KR | 20130020562 A | 2/2013 |
| KR | 101348544 B1 | 1/2014 |
| WO | 2013057375 A1 | 4/2013 |

OTHER PUBLICATIONS

International Search Report issued Nov. 1, 2019 of PCT/CN2019/077872 (4 pages).
XP30110551A, Nokia ,"Simplified DC prediction" JCTVC-G567; JCT-VC of ITU-T SG16 WP3 and ISO/IEC JTCI/SC29/WG11; Geneva, CH; Nov. 21-30, 2011. 3 pages.
XP30244163, Qualcomm Inc. "CE6.h related: Simplified DC predictor for depth intra modes" JCT3V-D0183; Joint Collaborative Team on 3D Video Coding Extensions of ITU-T SG16 WP3 and ISO/IEC JTC1/SC29/WG11; Incheon, KR; Apr. 20-26, 2013. 5 pages.
Examination Report for Indian Application No. 202127028952 issued Mar. 4, 2022. 5 pages with English translation.
Extended European Search Report for European Application No. 19919184.2 issued Oct. 25, 2021. 10 pages.
First Examination Report mailed Apr. 7, 2022 in EP Application No. 19919184.2, 8 pages.
Examination Report No. 1 for Australian Application No. 2019433376 issued May 9, 2022. 4 pages.
Examination Report for Canadian Application No. 3122891 issued Sep. 2, 2022. 8 pages.
Examination Report No. 2 for Australian Application No. 2019433376 Issued Oct. 27, 2022. 4 pages.
First Office Action for Chinese Application No. 202110576103.2 issued Sep. 27, 2022. 13 pages with English translation.
Nokia "Simplified DC prediction" JCTVC-G567; JCT-VC of ITU-T SG16 WP3 and ISO/IEC JTC1/SC29/WG11; 7th Meeting: Geneva, CH; Nov. 21-30, 2011. 3 pages.
Notice of Reasons for Refusal for Japanese Application No. 2021-551972 issued Nov. 8, 2022. 12 pages with English translation.
Santa Clara University et al. "3D-CE5.h related: Simplified DC predictor improvement for depth intra modes" JCT3V-F0157; ITU-T SG 16 WP 3 & ISO/IEC JTC 1/SC 29/WG 11; 6th Meeting; Geneva, CH; Oct. 25-Nov. 1, 2013. 8 pages.
Summons to attend oral proceedings for European Application No. 19919184.2 issued Sep. 5, 2022. 12 pages.
Brief Communication for European Application No. 19919184.2 issued Jan. 17, 2023. 7 pages.
Decision to Refuse Application for European Application No. 19919184.2 issued Feb. 14, 2023. 15 pages.
Examination Report for Australian Application No. 2019433376 issued Feb. 21, 2023. 4 pages.
Second Office Action for Chinese Application No. 202110576103.2 issued Feb. 4, 2023. 13 pages with English translation.
Second Office Action of the Japanese application No. 2021-551972, issued on May 26, 2023. 14 pages with English translation.
Decision of Rejection of the Chinese application No. 202110576103. 2, issued on May 31, 2023. 10 pages with English translation.
Second Office Action of the Canadian application No. 3122891, issued on Jun. 7, 2023. 5 pages.
Office Action for Israeli Application No. 283792 Issued Sep. 11, 2023. 4 Pages.
Qualcomm Incorporated "CE6.h related: Simplified DC predictor for depth intra modes" JCT3V-D0183, Joint Collaborative Team on 3D Video Coding Extensions of ITU-T SG 16 WP 3 and ISO/IEC JTC 1/SC 29/WG 11, 4th Meeting: Incheon, KR, Apr. 20-26, 2013, 5 Pages.
Non-Final Office Action for U.S. Appl. No. 17/356,148 issued on Sep. 2, 2021, 14 pages.
Non-Final Office Action for U.S. Appl. No. 17/720,442 issued on Feb. 16, 2023, 21 pages.
Notice of Allowance for U.S. Appl. No. 17/720,442 issued on Jul. 31, 2023, 15 pages.
Written Opinion mailed Nov. 1, 2019 in Application No. PCT/CN2019/077872 with translation, 6 pages.
First Written Opinion for Singaporean Patent Application No. 11202106215X. Mail Date: Apr. 18, 2024. 9 pages.
Hearing Notice for Indian Patent Application No. 202127028952. Mail Date: Jun. 19, 2024. 2 pages.
Notice of First Preliminary Rejection of the Korean application No. 10-2021-7030595, issued on Sep. 2, 2024. 13 pages with English translation.

* cited by examiner

INTRA PREDICTION METHOD AND APPARATUS, AND COMPUTER-READABLE STORAGE MEDIUM

CROSS-REFERENCE TO RELATED APPLICATION(S)

The present application is a continuation application of U.S. application Ser. No. 17/720,442 filed on Apr. 14, 2022, which is a continuation application of U.S. application Ser. No. 17/356,148 filed on Jun. 23, 2021, which is a continuation application of International PCT Application No. PCT/CN2019/077872, filed on Mar. 12, 2019, the entire content of which is hereby incorporated by reference.

TECHNICAL FIELD

Implementations of the present disclosure relate to video coding and decoding technology, relate but are not limited to a method and an apparatus for intra prediction, and a computer readable storage medium.

BACKGROUND

In versatile video coding and decoding, when intra prediction is performed on a current processing block, an optimal prediction mode (i.e., a prediction mode signalled in a bitstream) of a corresponding or spatial neighboring prediction block (also called a previous reconstructed block) for which intra prediction has been completed, a derivative mode of an optimal direction of the previous reconstructed block, and a combination of some preset intra prediction modes, are usually used as a candidate prediction mode set of the current processing block, and intra prediction is performed on the current processing block based on multiple candidate prediction modes in the set. Traditional intra prediction modes include DC mode, PLANAR and an angle prediction mode, and the DC mode is further discussed here.

At present, a process of intra prediction of the current processing block by using the DC mode is that: samples of a neighboring previous row and a neighboring left column of the current processing block are used as reference samples, and a DC coefficient is obtained through averaging the reference sample values of the reference samples, the DC coefficient is used as a prediction value of the current processing block to construct the prediction value of the current processing block.

However, since the above DC coefficient is obtained by averaging neighboring reference samples, and the larger the processing block size, the more the number of reference samples which are needed to construct the DC coefficient, and the higher the complexity of averaging. Therefore, the computational complexity will increase with the increase of processing block size.

SUMMARY

Implementations of the present disclosure provide a method and an apparatus for intra prediction, and a computer readable storage medium, which can reduce calculation amount and complexity of intra prediction, thereby improving coding and decoding efficiency.

In a first aspect, an implementation of the present disclosure provides a method for intra prediction, including: acquiring a first reference sample set corresponding to a current processing block, wherein the first reference sample set includes at least one of a reference row or a reference column adjacent to the current processing block; selecting a second reference sample set from the first reference sample set based on a preset selection mode, wherein the second reference sample set includes at least one reference sample in the reference row or the reference column adjacent to the current processing block; obtaining a prediction value of the current processing block based on the second reference sample set; and performing intra prediction on the current processing block based on the prediction value.

In the above solution, the preset selection mode includes at least one of a preset position, a preset sampling rate or a preset statistical characteristics.

In the above solution, when the preset selection mode is the preset position, selecting the second reference sample set from the first reference sample set based on the preset selection mode includes: determining a sub-reference sample at the preset position of each reference row or each reference column respectively from the first reference sample set; and determining the sub-reference sample as the second reference sample set.

In the above solution, when the preset selection mode is the preset sampling rate, selecting the second reference sample set from the first reference sample set based on the preset selection mode includes: downsampling the reference row or the reference column in the first reference sample set according to the preset sampling rate to obtain a downsampled reference sample; and determining the downsampled reference sample as the second reference sample set.

In the above solution, when the preset selection mode is the preset statistical characteristics, selecting the second reference sample set from the first reference sample set based on the preset selection mode includes: selecting the second reference sample set from the reference row or the reference column in the first reference sample set according to the preset statistical characteristics.

In the above solution, when the second reference sample set includes at least two reference samples, obtaining the prediction value of the current processing block based on the second reference sample set includes: averaging sample values of the at least two reference samples to obtain an average value; and setting the prediction value of the current processing block equal to the average value.

In the above solution, when the second reference sample set includes one reference sample, obtaining the prediction value of the current processing block based on the second reference sample set includes: determining a sample value of the reference sample as the prediction value of the current processing block.

In the above solution, the preset position is a middle position of the reference row or the reference column.

In the above solution, the preset sampling rate is one half.

In a second aspect, an apparatus for intra prediction is characterized by including: an acquiring unit, configured to acquire a first reference sample set corresponding to a current processing block, wherein the first reference sample set includes at least one of a reference row or a reference column adjacent to the current processing block; a determining unit, configured to select a second reference sample set from the first reference sample set based on a preset selection mode, wherein the second reference sample set includes at least one reference sample in the reference row or the reference column adjacent to the current processing block; and obtain a prediction value of the current processing block based on the second reference sample set; and a predicting unit, configured to perform intra prediction on the current processing block based on the prediction value.

In the above solution, the preset selection mode includes at least one of a preset position, a preset sampling rate or a preset statistical characteristics.

In the above solution, when the preset selection mode is the preset position, the determining unit is specifically configured to respectively determine a sub-reference sample at the preset position of each reference row or each reference column respectively from the first reference sample set; and determine the sub-reference sample as the second reference sample set. In the above solution, when the preset selection mode is the preset sampling rate, the determining unit is specifically configured to downsample the reference row or the reference column in the first reference sample set according to the preset sampling rate to obtain a down-sampled reference sample; and determine the down-sampled reference sample as the second reference sample set.

In the above solution, when the preset selection mode is the preset statistical characteristics, the determining unit is specifically configured to select the second reference sample set from the reference row or the reference column in the first reference sample set according to the preset statistical characteristics.

In the above solution, when the second reference sample set includes at least two reference samples, the determining unit is specifically configured to average sample values of the at least two reference samples to obtain an average value; and set the prediction value of the current processing block equal to the average value.

In the above solution, when the second reference sample set includes one reference sample, the determining unit is specifically configured to determine a sample value of the reference sample as the prediction value of the current processing block.

In the above solution, the preset position is a middle position of the reference row or the reference column.

In the above solution, the preset sampling rate is one half.

In a third aspect, an implementation of the present disclosure provides an apparatus for intra prediction, including: a memory and a processor, wherein the memory stores a computer program which is runnable on the processor, and the processor implements the above method for intra prediction when executing the program.

In a fourth aspect, an implementation of the present disclosure provides a computer-readable storage medium, on which a computer program is stored, wherein the computer program, when executed by a processor, implements the above method for intra prediction.

Implementations of the present disclosure provide a method for intra prediction and an apparatus, and a computer readable storage medium. The apparatus for intra prediction obtains a first reference sample set corresponding to a current processing block, wherein, the first reference sample set includes at least one of a reference row or a reference column adjacent to the current processing block; selects a second reference sample set from the first reference sample set based on a preset selection mode, wherein, the second reference sample set includes at least one reference sample in the reference row or the reference column adjacent to the current processing block; obtains a prediction value of the current processing block based on the second reference sample set; and performs intra prediction on the current processing block based on the prediction value. According to the above technical implementation solution, since when the apparatus for intra prediction performs intra prediction on the current processing block, part of reference samples are selected from the reference row or the reference column adjacent to the current processing block, and the prediction value of the current processing block is obtained based on the part of reference samples, the number of reference samples is relatively small, which reduces calculation amount and complexity of intra prediction, thereby improving coding and decoding efficiency.

DETAILED DESCRIPTION

In order to understand features and technical contents of implementations of the present disclosure in more detail, implementation modes of the implementations of the present disclosure will be described in detail below in conjunction with the accompanying drawings, which are for reference only and are not intended to limit the implementations of the present disclosure.

Firstly, concepts of intra prediction, video coding and decoding, and the like are introduced below.

A main function of prediction of coding and decoding is to construct a prediction value of a current processing block by using an existing reconstructed picture in space or time in video coding and decoding, and only transmit a difference between an original value and the prediction value, so as to reduce the amount of transmitted data.

Figure 1:
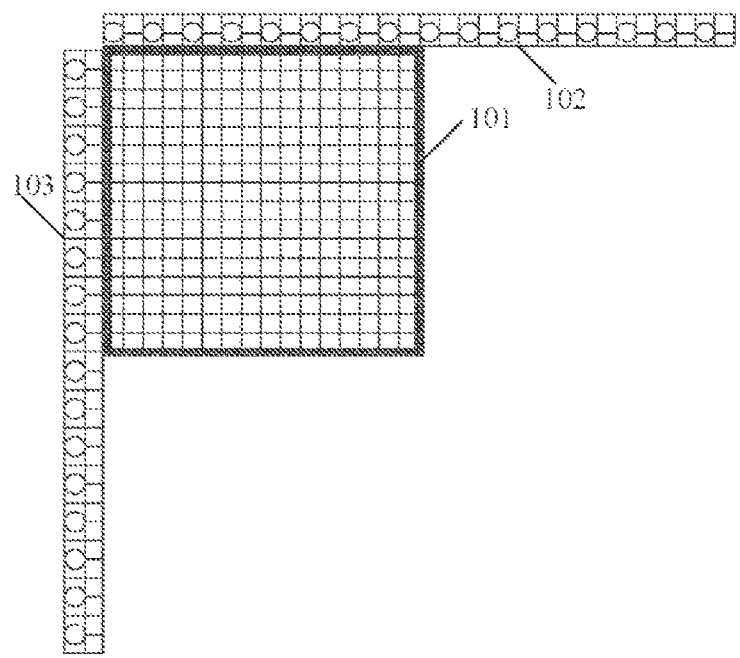
FIG. 1 is a first schematic diagram of a relationship between a current processing block and a reference sample set in the prior art.

A main function of intra prediction is to construct a prediction value of a current processing block by using the current processing block and samples in a previous row and samples in a left column adjacent to the current processing block. As shown in FIG. 1, each sample of a current processing block 101 is predicted by using restored neighboring samples around the current processing block 101 (i.e., samples in a previous row 102 and samples in a left column 103 adjacent to the current processing block).

Figure 2A:
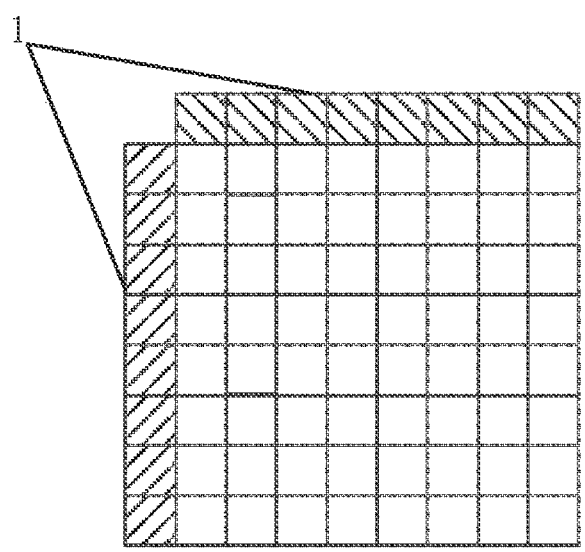
FIG. 2A is a second schematic diagram of a relationship between a current processing block and a reference sample set in the prior art.
Figure 2B:
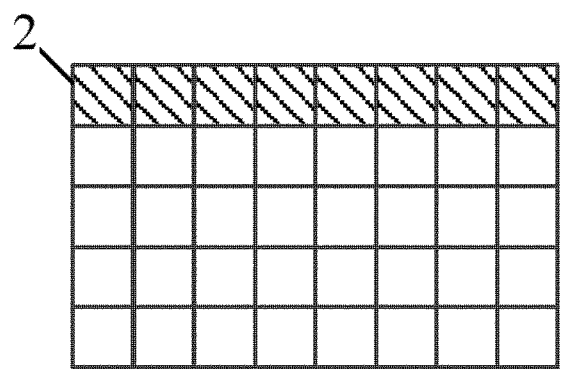
FIG. 2B is a third schematic diagram of a relationship between a current processing block and a reference sample set in the prior art.

In an implementation of the present disclosure, the intra prediction is performed for the processing block in a relatively planar region, and DC mode (a square block DC mode as shown in FIG. 2A and a rectangular block DC mode as shown in FIG. 2B) and PLANAR mode may be adopted. Herein, in the DC mode, a whole current processing block is filled with an average value of sample values (e.g., chrominance values or luminance values) corresponding to samples in the previous row or the left column, and in the PLANAR mode, the current processing block is filled in a gradual way.

Herein, a region 1 shown in FIG. 2A is a neighboring reconstruction reference sample.

It should be noted that Versatile Video Coding (VVC) and previous video coding technologies support various coding unit divisions such as quadtree, binary tree and trigeminal tree, etc., and a processing block generated by such division is a rectangular block. Therefore, when prediction in the DC mode is performed, if divided into square blocks, a prediction process for the square block is the same as that shown in FIG. 2A, and a reference sample set of the left column (a reference column) and the previous row (a reference row) of the current processing block is used for prediction. The DC mode of rectangular block is as shown in FIG. 2B. For a rectangular block, a DC coefficient is obtained by using a reference sample of the long side (i.e. region 2) or a reference sample of a short side An advantage of using only the reference sample of the long side is that a division operation when averaging sample values may be avoided, and coding and decoding quality is almost unchanged. For example, assuming that a size of the current processing block is 8×4, considering that the number of reference samples of the long side is 8, which is the power of 2, averaging may be performed directly by a displacement operation, thus reducing computational complexity.

Figure 3:
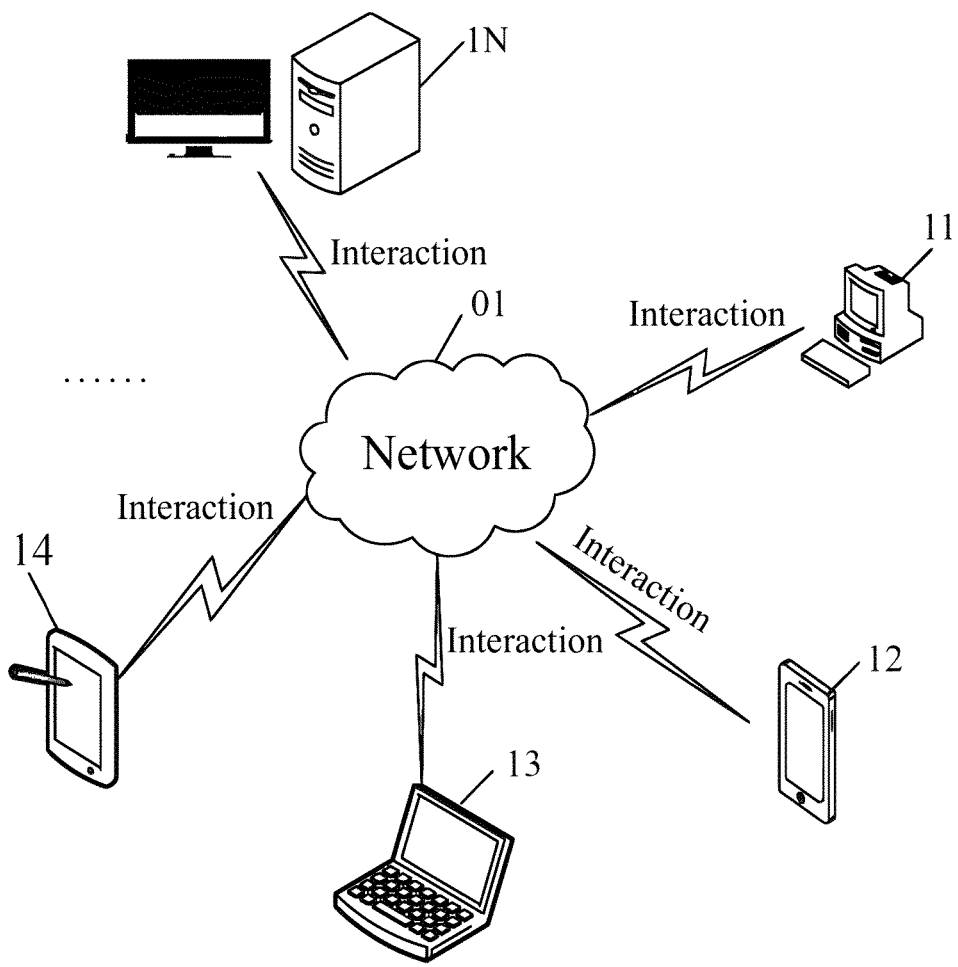
FIG. 3 is a schematic block diagram of composition of a video decoding system according to an implementation of the present disclosure.

On the basis of the above concepts, an implementation of the present disclosure provides a network architecture of a video coding and decoding system including a method for intra prediction. FIG. 3 is a schematic structure diagram of composition of a network architecture for video coding and decoding according to an implementation of the present disclosure. As shown in FIG. 3, the network architecture includes one or more electronic devices 11 to 1N and a communication network 01, wherein the electronic devices 11 to 1N may perform video interaction through the communication network 01. The electronic devices may be various types of devices with video coding and decoding functions in implementation processes. For example, the electronic devices may include mobile phones, tablet computers, personal computers, personal digital assistants, navigators, digital phones, video phones, televisions, sensing devices, servers, etc., which is not limited in the implementations of the present disclosure. Herein, an apparatus for intra prediction in an implementation of the present disclosure may be the above electronic device.

Herein, the electronic device in an implementation of the present disclosure has video coding and decoding functions, and generally includes a video encoder and a video decoder.

Figure 4A:
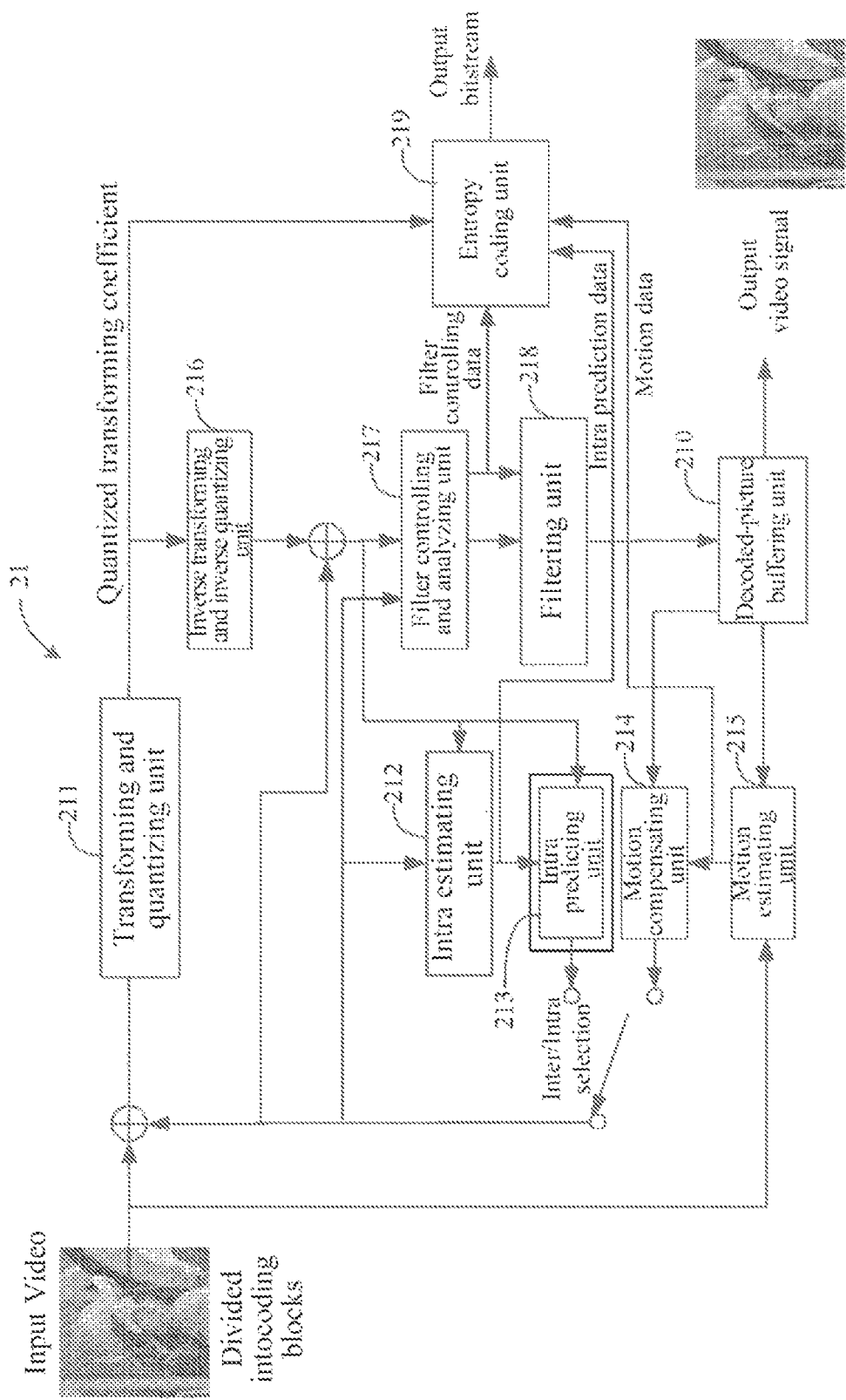
FIG. 4A is a schematic structure diagram of composition of a video encoder according to an implementation of the present disclosure.

For example, as shown in FIG. 4A, a structure of composition of a video encoder 21 includes: a transforming and quantizing unit 211, an intra estimating unit 212, an intra predicting unit 213, a motion compensating unit 214, a motion estimating unit 215, an inverse transforming and inverse quantizing unit 216, a filter controlling and analyzing unit 217, a filtering unit 218, an entropy coding unit 219, a decoded-picture buffering unit 210, etc. Herein, the filtering unit 218 may perform deblocking filtering and Sample Adaptive Offset (SAO) filtering, and the entropy coding unit 219 may perform header information coding and Context-based Adaptive Binary Arithmatic Coding (CABAC). For an input source video data, one block to be coded of a current video frame may be obtained by dividing a Coding Tree Unit (CTU), and then obtained residual information is transformed by the transforming and quantizing unit 211 after intra prediction or inter prediction is performed on the block to be coded, including transforming the residual information from a sample domain to a transform domain, and quantizing an obtained transform coefficient to further reduce a bit rate. The intra estimating unit 212 and the intra predicting unit 213 are used for performing intra prediction on the block to be encoded, for example, determining an intra prediction mode for encoding the block to be encoded. The motion compensating unit 214 and the motion estimating unit 215 are used for performing inter prediction encoding of the block to be encoded relative to one or more blocks in one or more reference frames to provide time prediction information. Herein, the motion estimating unit 215 is used for estimating a motion vector, the motion vector may be used for estimating the motion of the block to be encoded, and then the motion compensating unit 214 performs motion compensation based on the motion vector. After determining the intra prediction mode, the intra predicting unit 213 is also used for providing selected intra prediction data to the entropy coding unit 219, and the motion estimating unit 215 also sends the calculated and determined motion vector data to the entropy coding unit 219. In addition, the inverse transforming and inverse quantizing unit 216 is used for reconstructing the block to be encoded, reconstructing a residual block in the sample domain, removing blocking artifacts for the reconstructed residual block through the filter controlling and analyzing unit 217 and the filtering unit 218, and then adding the reconstructed residual block to one predictive block in a frame of the decoded-picture buffering unit 210 to generate a reconstructed video encoding block.

The entropy coding unit 219 is used for coding various coding parameters and quantized transform coefficients, and in a coding algorithm based on CABAC, a context content may be based on neighboring coding blocks, and may be used for coding information indicating the determined intra prediction mode, and outputting a bitstream of the video data. And the decoded-picture buffering unit 210 is used for storing the reconstructed video coding block for reference in prediction. With the progress of video coding, new reconstructed video coding blocks will be generated continuously, and these reconstructed video coding blocks will be stored in the decoded-picture buffering unit 210.

Figure 4B:
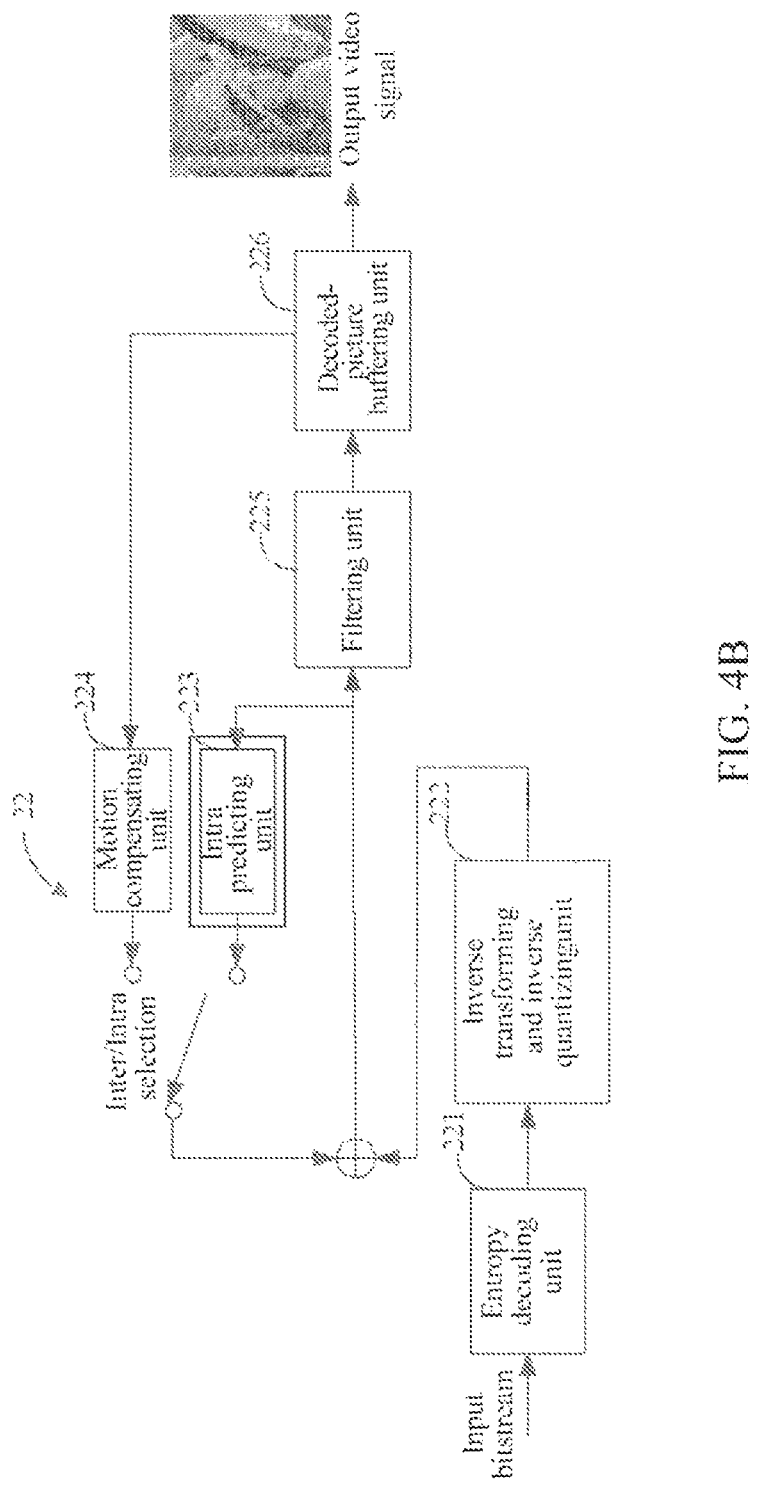
FIG. 4B is a schematic structure diagram of composition of a video decoder according to an implementation of the present disclosure.

A video decoder 22 corresponding to the video encoder 21, a structure of composition of which is as shown in FIG. 4B, includes: an entropy decoding unit 221, an inverse transforming and inverse quantizing unit 222, an intra predicting unit 223, a motion compensating unit 224, a filtering unit 225, a decoded-picture buffering unit 226, etc. Herein the entropy decoding unit 221 may realize header information decoding and CABAC decoding, and the filtering unit 225 may realize deblocking filtering and SAO filtering. After an input video signal is encoded in FIG. 4A, a bitstream of the video signal is output. The bitstream is input into the video decoder 22, and first passes through the entropy decoding unit 221 to obtain a decoded transform coefficient. The transform coefficient is processed by the inverse transforming and inverse quantizing unit 222 to generate a residual block in the sample domain. The intra predicting unit 223 may be used for generating prediction data of a current decoded block based on a determined intra prediction mode and data from a current frame or a picture which passes through via a decoded block previously. The motion compensating unit 224 determines prediction information of the current decoding block by parsing a motion vector and other associated syntax element, and uses the prediction information to generate a predictive block of the current decoding block which is being decoded. A decoded video block is formed by summing the residual block from the inverse transforming and inverse quantizing unit 222 with the corresponding predictive block generated by the intra predicting unit 223 or the motion compensating unit 224. The decoded video block passes through the filtering unit 225 so as to remove the blocking artifacts, thereby improving a video quality. Then, the decoded video block is stored in the decoded-picture buffering unit 226, the decoded-picture buffering unit 226 stores a reference picture which is used for subsequent intra prediction or motion compensation, and is also used for output display of a video signal.

Based on this, the technical solution of the present disclosure will be further elaborated with reference to the drawings and implementations. The method for intra prediction according to an implementation of the present disclosure may be applied to both the video encoder 21 and the video decoder 22, which is not specifically limited in an implementation of the present disclosure.

An implementation of the present disclosure provides a method for intra prediction, wherein the method is applied to an apparatus for intra prediction, and a function realized by the method may be realized by a processor in the apparatus for intra prediction calling program codes. Of course, the program code may be stored in a computer storage medium. It may be seen that the apparatus for intra prediction at least includes a processor and a storage medium.

Figure 5:
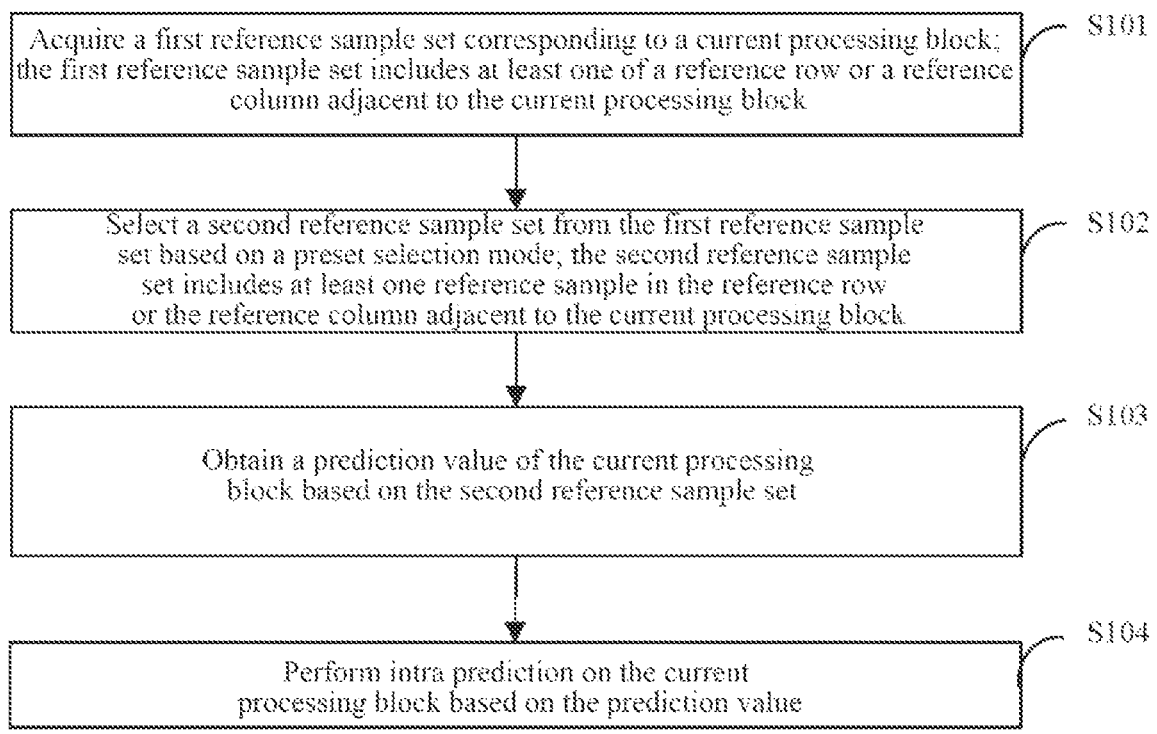
FIG. 5 is a first flow chart of a method for intra prediction according to an implementation of the present disclosure.

FIG. 5 is a schematic flowchart of an implementation process of a method for intra prediction according to an implementation of the present disclosure. As shown in FIG. 5, the method includes acts S101 to S104.

In S101, a first reference sample set corresponding to a current processing block is acquired, the first reference sample set includes at least one of a reference row or a reference column adjacent to the current processing block.

In S102, a second reference sample set is selected from the first reference sample set based on a preset selection mode, the second reference sample set includes at least one reference sample in the reference row or the reference column adjacent to the current processing block.

In S103, a prediction value of the current processing block is obtained based on the second reference sample set.

In S104, intra prediction is performed on the current processing block based on the prediction value.

In S101, the current processing block in an implementation of the present disclosure is a block to be coded or a block to be decoded, wherein the block to be coded is a picture region, on which prediction encoding needs to be performed currently, in a video frame. The block to be decoded is a picture region, on which decoding needs to be performed at present, in a video frame. The reason why reconstructed samples outside the current processing block are called reference samples or reference samples is that when predicting the current processing block, it is necessary to refer to attribute information of these reconstructed samples (such as luminance component, chrominance component, etc.) to predict samples to be predicted in the current processing block. Therefore, the reconstructed sample is a sample point for which prediction has been completed.

In an implementation of the present disclosure, when encoding and decoding the current processing block, the apparatus for intra prediction needs to obtain a first reference sample set corresponding to the current processing block, and then perform intra prediction based on the first reference sample set.

For example, for the DC mode, the first reference sample set here includes at least one of a reference row or a reference column adjacent to the current processing block. That is to say, in an implementation of the present disclosure, the first reference sample set represents three types of reference sample, i.e., reference row samples, reference column samples, or reference row and reference column samples.

It should be noted that the reference row samples and the reference column samples contain multiple samples. Selection of the first reference sample set in an implementation of the present disclosure may be acquired according to the actual regulation and requirement, which is not limited in an implementation of the present disclosure.

For example, the first reference sample set in FIG. 1 may include all reconstructed samples (reference row samples) in the previous row region 102 of the current processing block 101; or, the first reference sample set includes all reconstructed samples (reference row samples) in the left column region 103 of the current processing block 101; or, the first reference sample set includes all reconstructed samples in the previous row region 102 of the current processing block 101 and all reconstructed samples in the left column region 103 (i.e., reference row and reference column samples).

In S102, when performing intra prediction, the apparatus for intra prediction sets a preset selection mode in advance, and the apparatus for intra prediction may select a reference sample from the first reference sample set by using the preset selection mode, that is, select part of reference samples from the first reference sample set, and realize intra prediction of the current processing block based on the part of the reference samples.

Specifically, the apparatus for intra prediction uses a preset selection mode to select a second reference sample set from the first reference sample set. The second reference sample set includes at least one reference sample in the reference row or the reference column adjacent to the current processing block.

It should be noted that the first reference sample set is at least one of the reference row or the reference column adjacent to the current processing block. Then, the reference sample selected from the first reference sample set includes at least one reference sample in the reference row or the reference column adjacent to the current processing block. That is, the second reference sample set may be at least one reference sample in reference row samples, at least one reference sample in reference column samples, or may be obtained through a combination of at least one reference sample in reference row samples and at least one reference sample in reference column samples. A specific combination mode of the second reference sample set may be designed according to an actual situation, which is not limited in an implementation of the present disclosure.

In S103 and S104, after obtaining the second reference sample set, the apparatus for intra prediction may obtain the prediction value of the current processing block based on the second reference sample set, and perform intra prediction on the current processing block based on the prediction value.

Herein, the second reference sample set includes a sample identification of a reconstructed sample, such as a sample number.

In an implementation of the present disclosure, because the quantity of reference samples in the second reference sample set is indefinite, and may be one or more (that is, at least two) with respect to the quantity of reference samples, modes of obtaining the prediction value of the current processing block by the apparatus for intra prediction are different, which is as follows.

Mode 1: when the second reference sample set includes at least two reference samples, the apparatus for intra prediction averages sample values of the at least two reference samples to obtain an average value; and the prediction value of the current processing block is set to be equal to the average value.

Mode 2: when the second reference sample set includes one reference sample, the apparatus for intra prediction determines a sample value of the reference sample as the prediction value of the current processing block.

For example, for the DC mode, in an implementation of the present disclosure, the apparatus for intra prediction needs to determine the reference sample of the current processing block first, that is, the second reference sample set, then deduce a DC coefficient of the current processing block based on the reference sample in the second reference sample set, and obtain the prediction value of the current processing block based on the DC coefficient.

In an implementation of the present disclosure, when the second reference sample set includes at least two reference samples, the apparatus for intra prediction averages the sample values of the at least two reference samples to obtain an average value; and the DC coefficient of the current processing block is set to be equal to the average value, that is, the prediction value of the current processing block. When the second reference sample set includes one reference sample, the apparatus for intra prediction determines the sample value of the reference sample as the DC coefficient of the current processing block, that is, the prediction value of the current processing block.

It may be understood that for a large-area planar processing block, the prediction value of the current processing block is constructed by using part of existing reference sample sets, which reduces algorithm complexity and computation amount, thus improving coding and decoding efficiency.

In some implementations of the present disclosure, the preset selection mode includes at least one of a preset position, a preset sampling rate or a preset statistical characteristics, which is not limited in an implementation of the present disclosure.

Based on different preset selection modes, the second reference sample sets on which the method for intra prediction is based are different.

Figure 6:
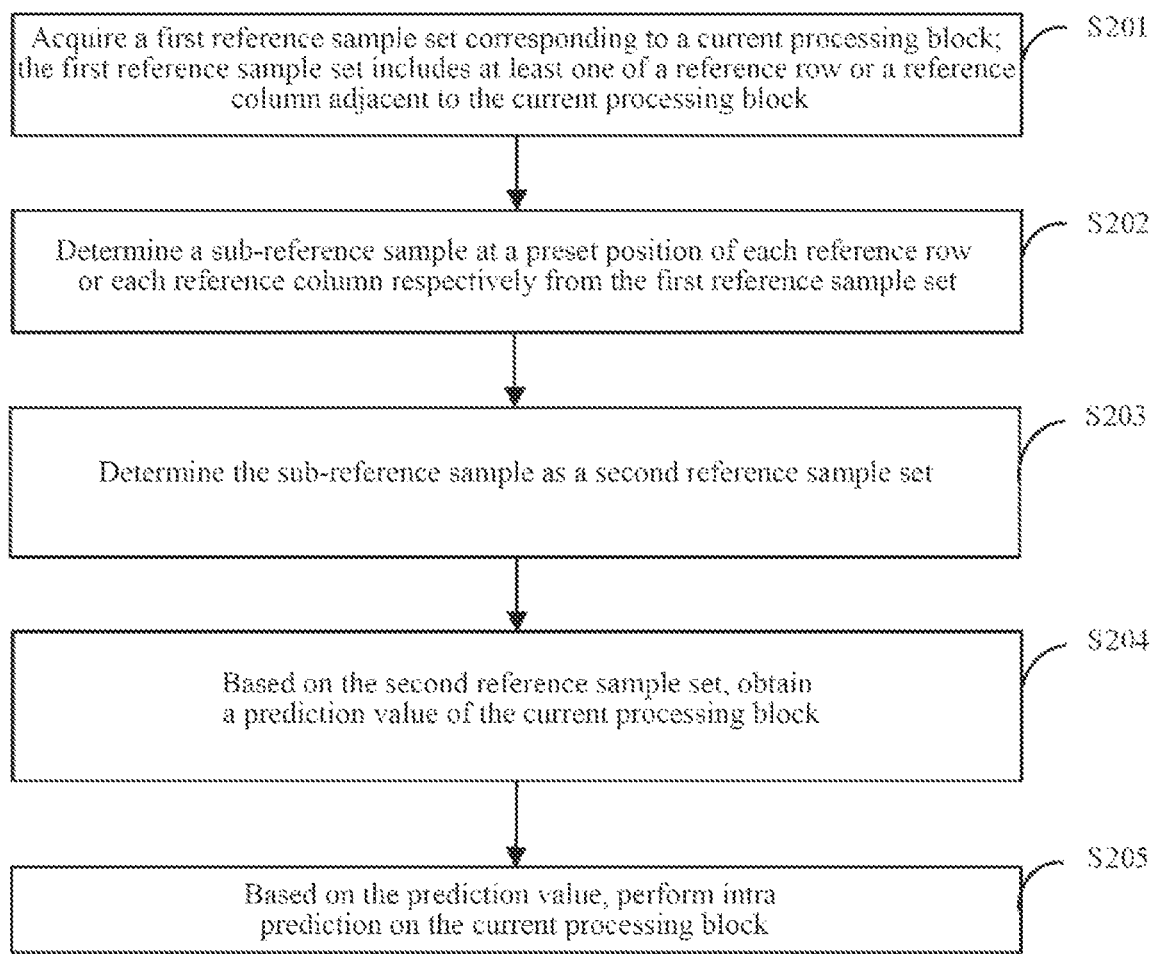
FIG. 6 is a second flow chart of a method for intra prediction according to an implementation of the present disclosure.

In some implementations of the present disclosure, as shown in FIG. 6, when the preset selection mode is the preset position, a process of an intra prediction mode according to an implementation of the present disclosure includes acts S201 to S205.

In S201, a first reference sample set corresponding to a current processing block is acquired; wherein the first reference sample set includes at least one of a reference row or a reference column adjacent to the current processing block.

An implementation process of S201 in an implementation of the present disclosure is consistent with the description of the implementation process of S101, and will not be repeated here.

In S202, a sub-reference sample at a preset position of each reference row or each reference column is/are determined respectively from the first reference sample set.

In S203, the sub-reference sample is/are determined as the second reference sample set.

In S202 and S203, based on the description of the implementation process of S102, the apparatus for intra prediction may select a sub-reference sample at a preset position as the second reference sample set with respect to a reference row or a reference column in the first reference sample set, that is, determine a sub-reference sample at a preset position of each reference row or each reference column respectively from the first reference sample set, and determine the sub-reference sample as the second reference sample set.

In an implementation of the present disclosure, when the first reference sample set includes reference row samples, the apparatus for intra prediction acquires a reference sample at a preset position in the reference row samples as a sub-reference sample, and determines the sub-reference sample as a second reference sample set. When the first reference sample set includes reference column samples, the apparatus for intra prediction acquires a reference sample at a preset position in the reference column samples as a sub-reference sample, and determines the sub-reference sample as a second reference sample set. When the first reference sample set includes reference row and reference column samples, the apparatus for intra prediction acquires a first reference sample at a preset position in reference column samples and a second reference sample at a preset position in reference row samples, combines the first reference sample and the second reference sample as sub-reference samples, and determines the sub-reference samples as a second reference sample set.

In an implementation of the present disclosure, the preset position is a middle position of a reference row or a reference column, or the preset positions may also be multiple positions on both sides of the reference row or the reference column, etc., which is not limited in an implementation of the present disclosure.

Figure 7:
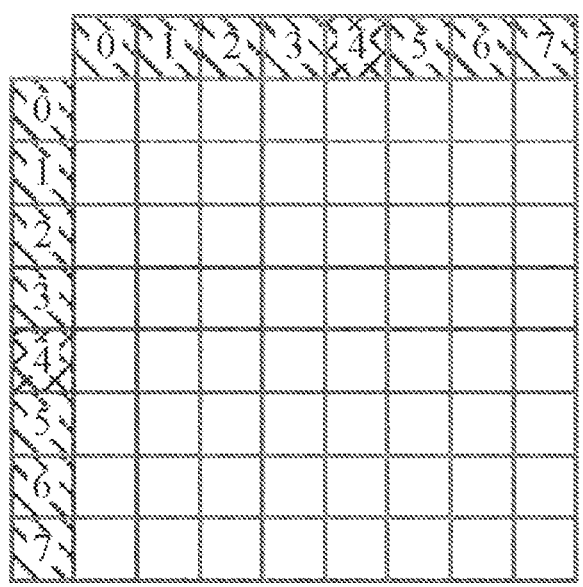
FIG. 7 is a first schematic diagram of an exemplary relationship between a current processing block and a reference sample set according to an implementation of the present disclosure.
Figure 8:
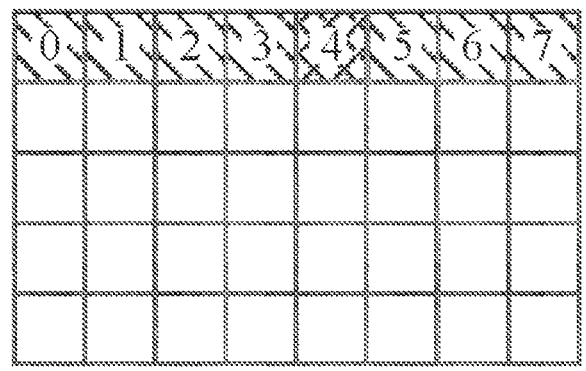
FIG. 8 is a second schematic diagram of an exemplary relationship between a current processing block and a reference sample set according to an implementation of the present disclosure.

For example, the DC mode is taken as an example for explanation. The apparatus for intra prediction selects two sub-reference samples from an existing first reference sample set based on the preset position, and an average value of the two sub-reference samples is used as a DC coefficient. Assuming that the preset position is the middle position of the reference row or the reference column, when the current processing block is a square, part of samples in a left column sample set and a previous row sample set of a center position of the current processing block are selected as part of reference samples. Assuming that a size of the current processing block is N×N, the samples at the N/2 position (a position index starts from 0) in the sample set in the left column and at the N/2 position (a position index starts from 0) in the sample set in the previous row are respectively selected as sub-reference samples. For example, in FIG. 7, the size of the current block is 8×8, and samples represented by lines are an existing reference sample set, that is, the first reference sample set. At this time, a sample at a position with an index number 4 in the sample set in the left column and the previous row is selected as the sub-reference sample, that is, the second reference sample set, for constructing the DC coefficient. When the current processing block is a rectangle, a reference sample at a position of ½ of a long side in the rectangle is selected as the sub-reference sample. Assuming that the size of the current block is N×M (N>M), a sample at a position of N/2 of a side with a length N is selected as the sub-reference sample. For example, in FIG. 8, the size of the current processing block is 8×4, and samples represented by lines are an existing reference sample set, that is, the first reference sample set. At this time, a sample at a position with an index number 4 in the sample set in the previous row is selected as the sub-reference sample, that is, the second reference sample set, for constructing the DC coefficient.

It may be understood that computational complexity of DC coefficient derivation may be greatly reduced by using the intra predicting mode in the present disclosure, and computation amount for square blocks is reduced by ½, and computation amount for rectangular blocks is reduced by ¾. With VTM4.0 as a benchmark, coding time and decoding time can be reduced with the coding rate unchanged under a premise of a same recovered video quality.

It should be noted that, for a video picture, a video frame may be divided into squares or rectangles, etc. At this time, for a situation that there are both reference row samples and a reference column samples in the first reference sample set, the preset position may be different positions or the same position for the reference row samples and the reference column samples, which is not limited in an implementation of the present disclosure.

In an implementation of the present disclosure, for the current processing block, no matter it is a square block or a rectangular block, a combination of sub-reference samples at preset positions in the sample sets of the left column and the previous row is uniformly selected as a second reference sample set for constructing the DC coefficient. Or, for the current processing block, no matter it is a square block or a rectangular block, only a first sub-reference sample at the preset position in the sample set of the left column or a second sub-reference sample at the preset position in the sample set of the previous row is uniformly used, and the first sub-reference sample or the second sub-reference sample is used as the second reference sample set for constructing the DC coefficient.

Figure 9:
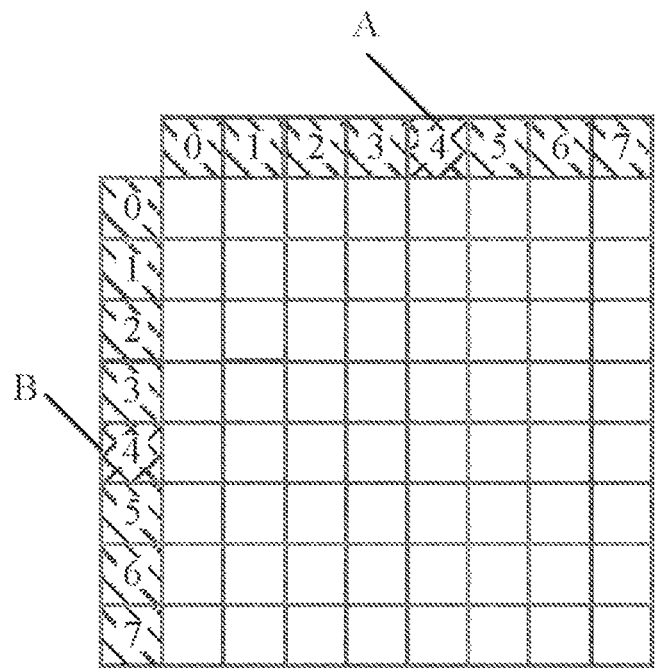
FIG. 9 is a third schematic diagram of an exemplary relationship between a current processing block and a reference sample set according to an implementation of the present disclosure.
Figure 10:
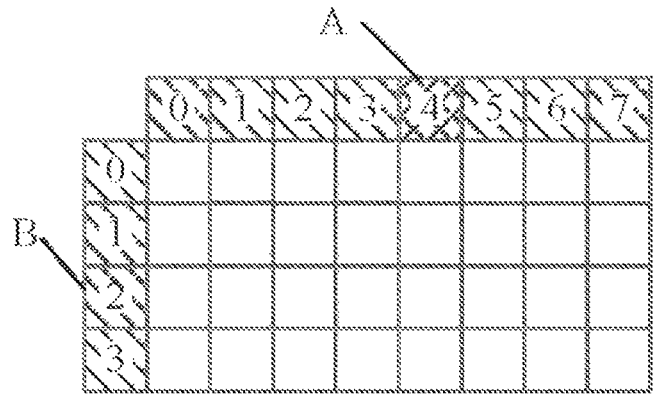
FIG. 10 is a fourth schematic diagram of an exemplary relationship between a current processing block and a reference sample set according to an implementation of the present disclosure.

For example, as shown in FIGS. 9 and 10, a combination of sub-reference samples at preset positions in the sample sets of the left column and the previous row is uniformly selected as the second reference sample set. For a square block (FIG. 9) and a rectangular block (FIG. 10), reference samples A and B of the left column and the previous column of a center position are uniformly selected as the second reference sample set for constructing the DC coefficient.

For example, only a first sub-reference sample at the preset position in the sample set of the left column or a second sub-reference sample at the preset position in the sample set of the previous row is uniformly used, and the first sub-reference sample or the second sub-reference sample is used as the second reference sample set for constructing the DC coefficient, as described below, (1) for a rectangular block, a sub-reference sample at a position of ½ of a long side is selected as the second reference sample set; and for a square block, a combination of a sub-reference sample at a position of ½ in a previous row and a left column is selected as the second reference sample set. (2) For a rectangular block, a sub-reference sample at a position of ½ of a short side is selected as the second reference sample set, and for a square block, a combination of a sub-reference sample at a position of ½ of a previous row and a left column is selected as the second reference sample set. That is to say, for a rectangular block, a sub-reference sample at a preset position on one side may be selected as the second reference sample set, which is not limited in an implementation of the present disclosure.

In S204, based on the second reference sample set, a prediction value of a current processing block is obtained.

An implementation process of S204 in an implementation of the present disclosure is consistent with the description of the implementation process of S103, and will not be repeated here.

In S205, based on the prediction value, intra prediction is performed on the current processing block.

An implementation process of S205 in an implementation of the present disclosure is consistent with the description of the implementation process of S104, and will not be repeated here.

It may be understood that for a large-area planar processing block, the prediction value of the current processing block is constructed by using part of existing reference sample sets, which reduces algorithm complexity and computation amount, thus improving coding and decoding efficiency.

Figure 11:
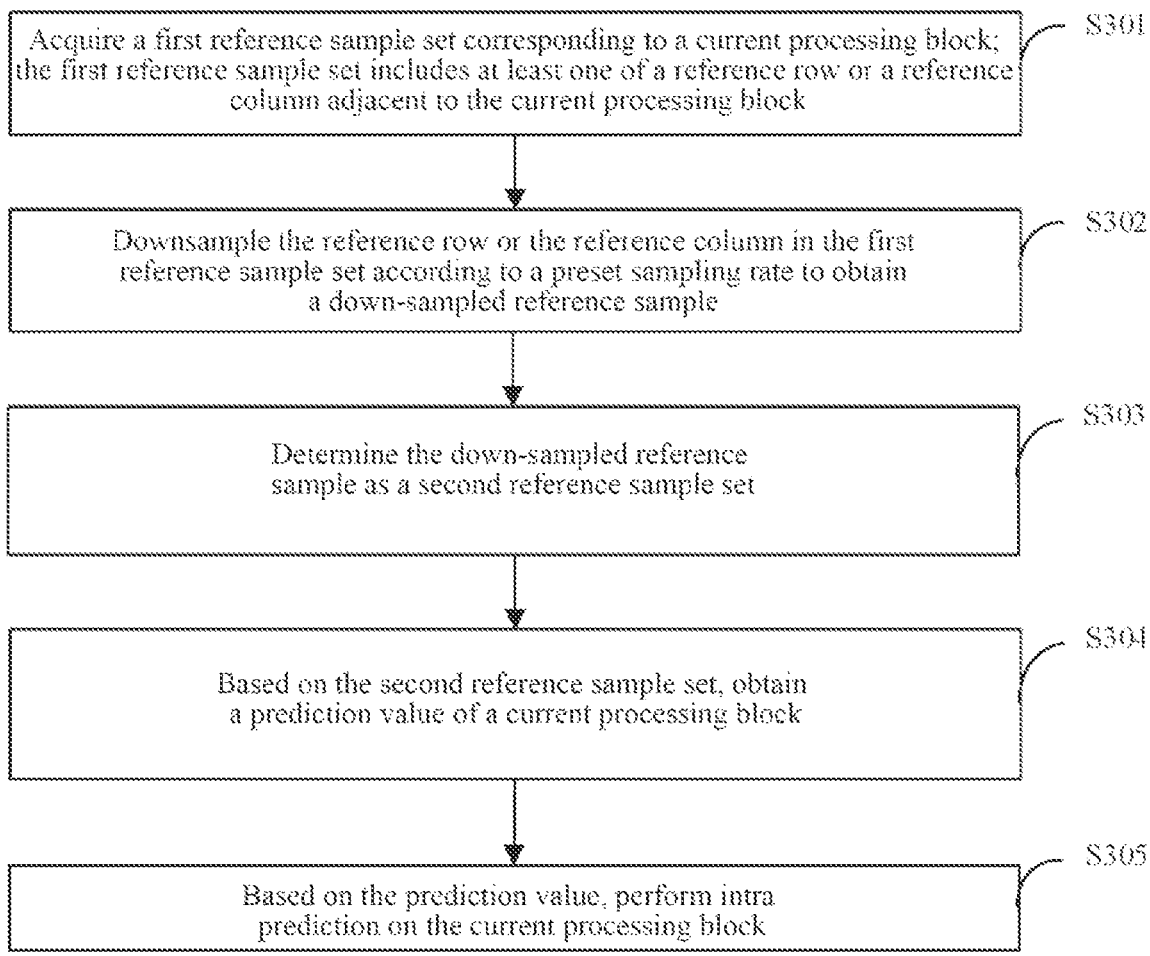
FIG. 11 is a third flow chart of a method for intra prediction according to an implementation of the present disclosure.

In some implementations of the present disclosure, as shown in FIG. 11, when the preset selection mode is the preset sampling rate, a process of an intra prediction mode according to an implementation of the present disclosure includes acts S301 to S305.

In S301, a first reference sample set corresponding to a current processing block is acquired; wherein the first reference sample set includes at least one of a reference row or a reference column adjacent to the current processing block.

An implementation process of S301 in an implementation of the present disclosure is consistent with the description of the implementation process of S101, and will not be repeated here.

In S302, the reference row or the reference column in the first reference sample set is downsampled according to the preset sampling rate to obtain a down-sampled reference sample.

In S303, the down-sampled reference sample is/are determined as the second reference sample set.

In S302 and S303, based on the description of the implementation of S102, the apparatus for intra prediction may downsample the reference row or the reference column in the first reference sample set according to the preset sampling rate to obtain the down-sampled reference sample, wherein the down-sampled reference sample is/are used as the second reference sample set.

In an implementation of the present disclosure, the preset sampling rate may be one-half or other sampling values, such as three-quarters, two-fifths, which is not limited in an implementation of the present disclosure.

Figure 12:
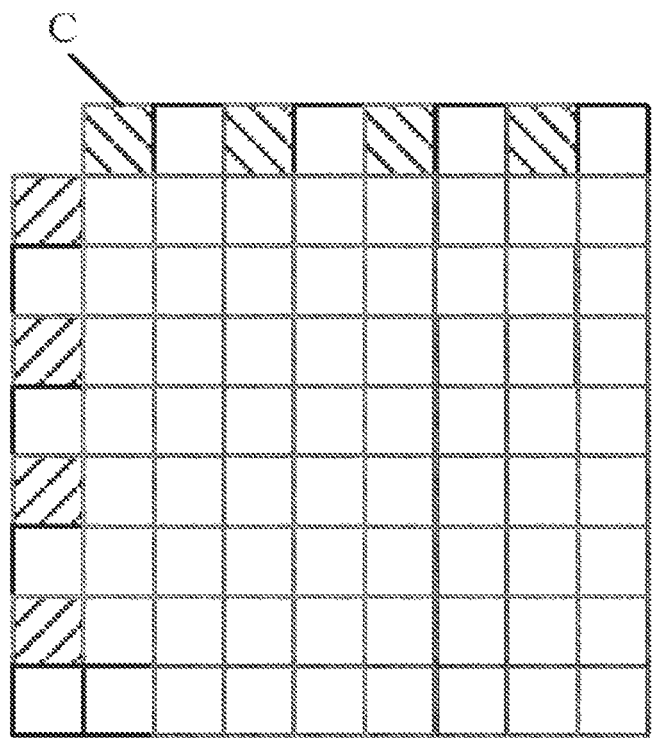
FIG. 12 is a fifth schematic diagram of an exemplary relationship between a current processing block and a reference sample set according to an implementation of the present disclosure.
Figure 13:
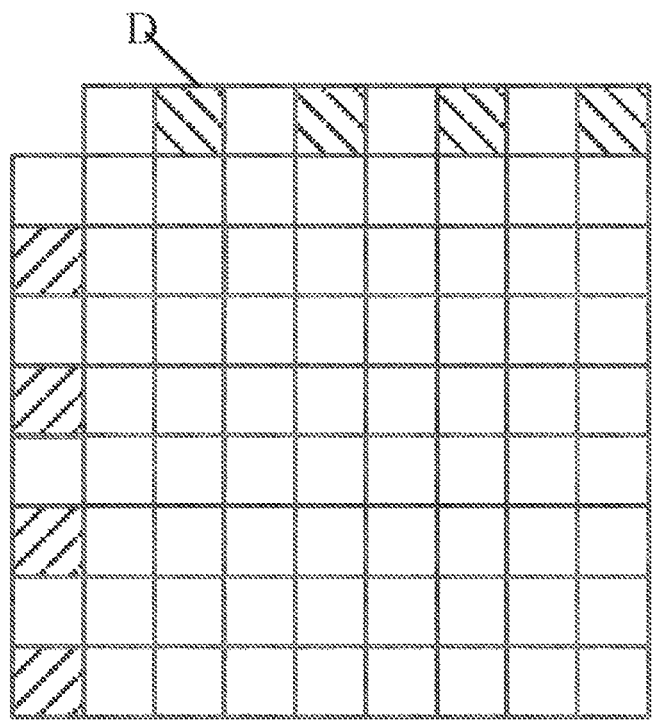
FIG. 13 is a sixth schematic diagram of an exemplary relationship between a current processing block and a reference sample set according to an implementation of the present disclosure.

For example, a current first reference sample set is downsampled by ½, and a DC coefficient is constructed by using the down-sampled reference sample. For a square block, as shown in FIG. 12, lines represent a down-sampled reference sample C. As shown in FIG. 13, lines represent a down-sampled reference sample D.

It should be noted that the preset sampling rate may be understood as a mode of selecting the preset position, so the principle of acquiring the second reference sample set by the apparatus for intra prediction according to the preset sampling rate is the same as the principle of acquiring the second reference sample set according to the preset position, which is not limited in an implementation of the present disclosure.

In S304, based on the second reference sample set, a prediction value of a current processing block is obtained.

An implementation process of S304 in an implementation of the present disclosure is consistent with the description of the implementation process of S103, and will not be repeated here.

In S305, based on the prediction value, intra prediction is performed on the current processing block.

An implementation process of S305 in an implementation of the present disclosure is consistent with the description of the implementation process of S104, and will not be repeated here.

It may be understood that for a large-area planar processing block, the prediction value of the current processing block is constructed by using part of existing reference sample sets, which reduces algorithm complexity and computation amount, thus improving coding and decoding efficiency.

Figure 14:
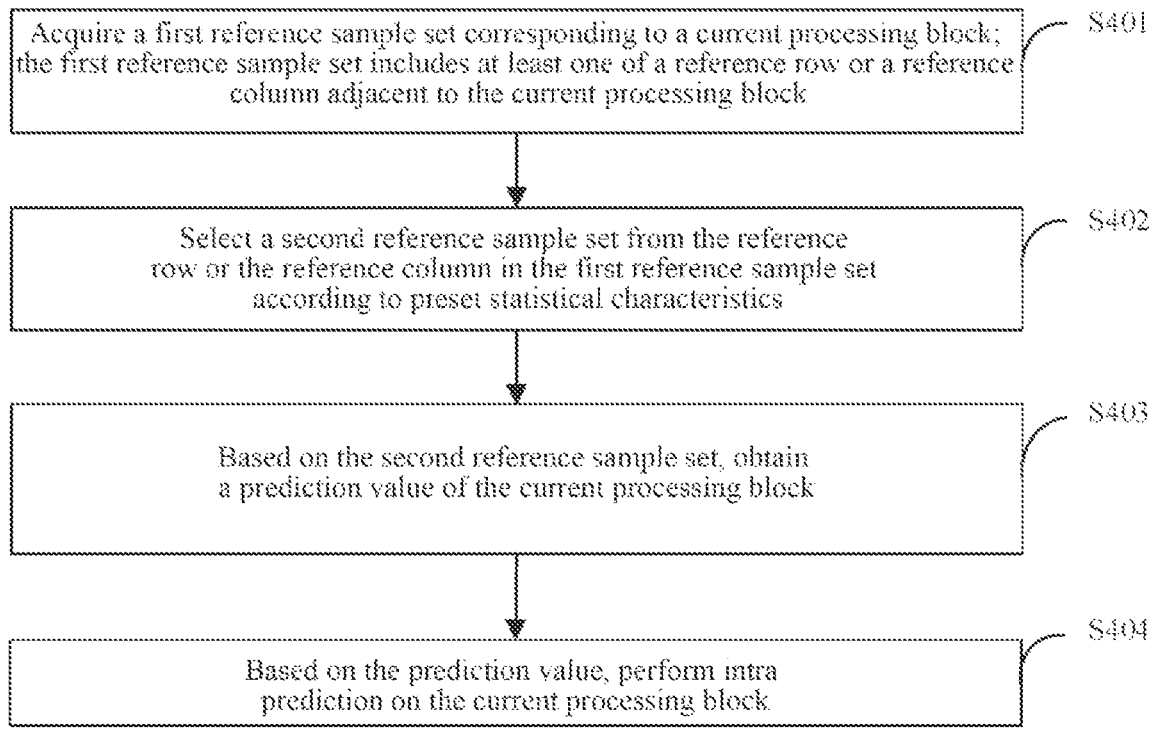
FIG. 14 is a fourth flow chart of a method for intra prediction according to an implementation of the present disclosure.

In some implementations of the present disclosure, as shown in FIG. 14, when the preset selection mode is the preset statistical characteristics, a process of an intra prediction mode according to an implementation of the present disclosure includes acts S401 to S404.

In S401, a first reference sample set corresponding to a current processing block is acquired; wherein the first reference sample set includes at least one of a reference row or a reference column adjacent to the current processing block.

An implementation process of S401 in an implementation of the present disclosure is consistent with the description of the implementation process of S101, and will not be repeated here.

In S402, a second reference sample set is selected from the reference row or the reference column in the first reference sample set according to the preset statistical characteristics.

In an implementation of the present disclosure, the apparatus for intra prediction may select, according to the preset statistical characteristics, the second reference sample set that meets the statistical characteristics from the reference row or the reference column in the first reference sample set.

In an implementation of the present disclosure, the preset statistical characteristics represents a sample point, which best represents the neighboring reference sample, in the reference row or the reference column.

It should be noted that the preset statistical characteristics may be understood as a mode of selecting the preset position, so the principle of acquiring the second reference sample set by the apparatus for intra prediction according to the preset statistical characteristics is the same as the principle of acquiring the second reference sample set according to the preset position, which is not limited in an implementation of the present disclosure.

In S403, based on the second reference sample set, a prediction value of the current processing block is obtained.

An implementation process of S403 in an implementation of the present disclosure is consistent with the description of the implementation process of S103, and will not be repeated here.

In S404, based on the prediction value, intra prediction is performed on the current processing block.

An implementation process of S404 in an implementation of the present disclosure is consistent with the description of the implementation process of S104, and will not be repeated here.

It may be understood that for a large-area planar processing block, the prediction value of the current processing block is constructed by using part of existing reference sample sets, which reduces algorithm complexity and computation amount, thus improving coding and decoding efficiency.

Based on the foregoing implementation, an implementation of the present disclosure provides an apparatus for intra prediction, various units included in the apparatus and various modules included in the various units may be realized by a processor in the apparatus for intra prediction. Of course, it may also be realized by a specific logic circuit. In an implementation process, the processor may be a Central Processing Unit (CPU), a microprocessor (MPU), a Digital Signal Processor (DSP) or a Field Programmable Gate Array (FPGA), etc.

Figure 15:
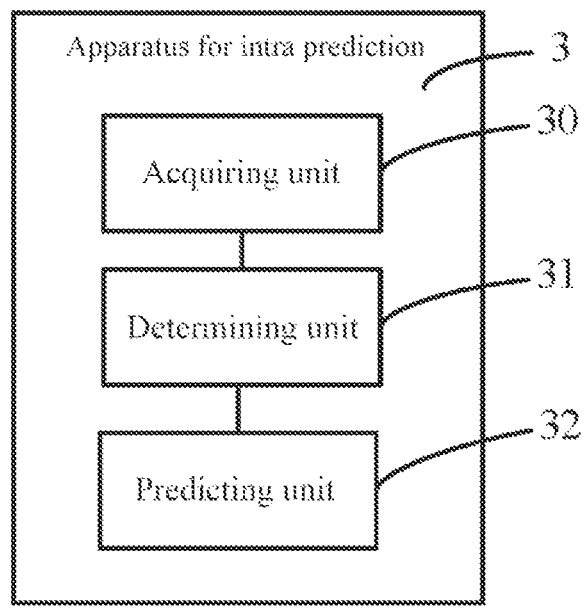
FIG. 15 is a first schematic structure diagram of an apparatus for intra prediction according to an implementation of the present disclosure.

As shown in FIG. 15, an implementation of the present disclosure provides an apparatus for intra prediction 3, which includes: an acquiring unit 30, configured to acquire a first reference sample set corresponding to a current processing block, wherein the first reference sample set includes at least one of a reference row or a reference column adjacent to the current processing block; a determining unit 31, configured to select a second reference sample set from the first reference sample set based on a preset selection mode, wherein the second reference sample set includes at least one reference sample in the reference row or the reference column adjacent to the current processing block; and obtain a prediction value of the current processing block based on the second reference sample set; and a predicting unit 32, configured to perform intra prediction on the current processing block based on the prediction value.

In some implementations of the present disclosure, the preset selection mode includes at least one of a preset position, a preset sampling rate or a preset statistical characteristics.

In some implementations of the present disclosure, when the preset selection mode is the preset position, the determining unit 31 is specifically configured to determine a sub-reference sample at the preset position of each reference row or each reference column respectively from the first reference sample set; and determine the sub-reference sample as the second reference sample set.

In some implementations of the present disclosure, when the preset selection mode is the preset sampling rate, the determining unit 31 is specifically configured to downsample the reference row or the reference column in the first reference sample set according to the preset sampling rate to obtain a down-sampled reference sample; and determine the down-sampled reference sample as the second reference sample set.

In some implementations of the present disclosure, when the preset selection mode is the preset statistical characteristics, the determining unit 31 is specifically configured to select the second reference sample set from the reference row or the reference column in the first reference sample set according to the preset statistical characteristics.

In some implementations of the present disclosure, when the second reference sample set includes at least two reference samples, the determining unit 31 is specifically configured to average sample values of the at least two reference samples to obtain an average value; and set the prediction value of the current processing block equal to the average value.

In some implementations of the present disclosure, when the second reference sample set includes one reference sample, the determining unit 31 is specifically configured to determine a sample value of the reference sample as the prediction value of the current processing block.

In some implementations of the present disclosure, the preset position is a middle position of the reference row or the reference column.

In some implementations of the present disclosure, the preset sampling rate is one half.

The description of the above apparatus implementation is similar to the description of the above method implementation, and has similar beneficial effects as the method implementation. For technical details not disclosed in the apparatus implementation of the present disclosure, please refer to the description of the method implementation of the present disclosure to understand.

It should be noted that in the implementations of the present disclosure, if the above method for intra prediction is implemented in the form of a software function module and when sold or used as an independent product, it may also be stored in a computer readable storage medium. Based on this understanding, the technical solutions of the implementations of the present disclosure, in essence, or the part contributing to the related art, may be embodied in the form of a software product, the computer software product is stored in one storage medium and includes several instructions to make an electronic device (which may be a mobile phone, a tablet, a personal computer, a personal digital assistant, a navigator, a digital telephone, a video telephone, a television, a sensing device, a server, etc.) perform all or part of the method described in various implementations of the present disclosure. And the aforementioned storage medium includes various media which may store program codes, such as a U disk, a mobile hard disk, a Read Only Memory (ROM), a magnetic disk or an optical disk. Thus, the implementations of the present disclosure are not limited to any specific combination of hardware and software.

Figure 16:
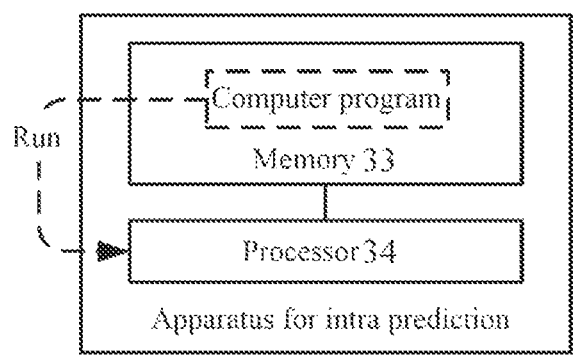
FIG. 16 is a second schematic structure diagram of an apparatus for intra prediction according to an implementation of the present disclosure.

In practical application, as shown in FIG. 16, an implementation of the present disclosure provides an apparatus for intra prediction, which includes: a memory 33 and a processor 34, wherein the memory 33 stores a computer program that is runnable on the processor 34, and when the processor 34 executes the program, the acts in the method for intra prediction provided in the above implementation are realized.

Accordingly, an implementation of the present disclosure provides a computer readable storage medium on which a computer program is stored, wherein when the computer program is executed by a processor, the acts in the method for intra prediction provided in the above implementation are realized.

It should be pointed out here that the descriptions of the above storage medium and the apparatus implementation are similar to the description of the above method implementation, and they have similar beneficial effects as the method implementation. For technical details not disclosed in the storage medium and the apparatus implementation of the present disclosure, please refer to the description of the method implementation of the present disclosure to understand.

What are described above are merely implementations of the present disclosure, but the protection scope of the present disclosure is not limited thereto. Any variation or substitution that may easily occur to a person skilled in the art within the technical scope disclosed by the present disclosure shall be included within the protection scope of the present disclosure. Therefore, the protection scope of the present disclosure shall be determined by the protection scope of the claims.

INDUSTRIAL APPLICABILITY

In implementations of the present disclosure, when an apparatus for intra prediction performs intra prediction on a current processing block, it selects part of reference samples from a reference row or a reference column adjacent to the current processing block, and obtains a prediction value of the current processing block based on the part of reference samples, the number of reference samples is relatively small, which reduces calculation amount and complexity of intra prediction, thereby improving coding and decoding efficiency.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A video decoding method, comprising:
    acquiring a first reference sample set corresponding to a current processing block;
    selecting a second reference sample set from the first reference sample set based on a preset position,
        wherein selecting the second reference sample set from the first reference sample set based on a preset position comprises:
        downsampling the reference samples in the first reference sample set according to the preset position to acquire a down-sampled reference sample; and
        determining the down-sampled reference sample as the second reference sample set; and
    acquiring a prediction value of the current processing block based on the second reference sample set;
    wherein the preset position is a middle position of at least one of a reference row and a reference column in the first reference sample set wherein when the second reference sample set comprises one reference sample, acquiring the prediction value of the current processing block based on the second reference sample set comprises: determining a sample value of the reference sample as the prediction value of the current processing block.

2. The method of claim 1, wherein selecting a second reference sample set from the first reference sample set based on a preset position comprises:
determining a sub-reference sample at a preset position of the reference samples from the first reference sample set; and
determining the sub-reference sample as the second reference sample set.

3. The method of claim 1, wherein selecting a second reference sample set from the first reference sample set based on a preset position comprises:
selecting the second reference sample set from the reference samples in the first reference sample set according to a preset statistical characteristics.

4. The method of claim 1, wherein when the second reference sample set comprises at least two reference samples, acquiring the prediction value of the current processing block based on the second reference sample set comprises:
averaging sample values of the at least two reference samples to acquire an average value; and
setting the prediction value of the current processing block equal to the average value.

5. The method of claim 1, wherein, the first reference sample set comprises at least one of a reference row or a reference column adjacent to the current processing block, and the preset position is one half.

6. A video decoding apparatus, comprising: a memory and a processor, wherein the memory stores a computer program which is runnable on the processor, and when the program is executed, the processor is configured to acquire a first reference sample set corresponding to a current processing block;
select a second reference sample set from the first reference sample set based on a preset position,
wherein selecting the second reference sample set from the first reference sample set based on a preset position comprises:
downsampling the reference samples in the first reference sample set according to the preset position to acquire a down-sampled reference sample; and
determining the down-sampled reference sample as the second reference sample set; and
acquire a prediction value of the current processing block based on the second reference sample set;
wherein the preset position is a middle position of at least one of a reference row and a reference column in the first reference sample set wherein when the second reference sample set comprises one reference sample, acquiring the prediction value of the current processing block based on the second reference sample set comprises: determining a sample value of the reference sample as the prediction value of the current processing block.

7. The apparatus of claim 6, wherein
the processor is further configured to determine a sub-reference sample at a preset position of the reference samples from the first reference sample set; and determine the sub-reference sample as the second reference sample set.

8. The apparatus of claim 6, wherein
the processor is further configured to select the second reference sample set from the reference samples in the first reference sample set according to a preset statistical characteristics.

9. The apparatus of claim 6, wherein when the second reference sample set comprises at least two reference samples,
the processor is configured to average sample values of the at least two reference samples to acquire an average value; and set the prediction value of the current processing block equal to the average value.

10. The apparatus of claim 6, wherein the first reference sample set comprises at least one of a reference row or a reference column adjacent to the current processing block, and the preset position is one half.

11. A video encoding apparatus, comprising: a memory and a processor, wherein the memory stores a computer program which is runnable on the processor, and when the program is executed, the processor is configured to acquire a first reference sample set corresponding to a current processing block;
select a second reference sample set from the first reference sample set based on a preset position,
wherein selecting the second reference sample set from the first reference sample set based on a preset position comprises:
downsampling the reference samples in the first reference sample set according to the preset position to acquire a down-sampled reference sample; and
determining the down-sampled reference sample as the second reference sample set; and
acquire a prediction value of the current processing block based on the second reference sample set;
wherein the preset position is a middle position of at least one of a reference row and a reference column in the first reference sample set wherein when the second reference sample set comprises one reference sample, acquiring the prediction value of the current processing block based on the second reference sample set comprises: determining a sample value of the reference sample as the prediction value of the current processing block.

12. The apparatus of claim 11, wherein
the processor is further configured to determine a sub-reference sample at a preset position of the reference samples from the first reference sample set; and determine the sub-reference sample as the second reference sample set.

13. The apparatus of claim 11, wherein
the processor is further configured to select the second reference sample set from the reference samples in the first reference sample set according to a preset statistical characteristics.

14. The apparatus of claim 11, wherein when the second reference sample set comprises at least two reference samples,
the processor is configured to average sample values of the at least two reference samples to acquire an average value; and set the prediction value of the current processing block equal to the average value.

15. The apparatus of claim 11, wherein when the second reference sample set comprises one reference sample,
the processor is configured to determine a sample value of the reference sample as the prediction value of the current processing block.

* * * * *